3,639,628
METHOD OF LOWERING ABNORMALLY HIGH LEVEL OF BLOOD UREA

William J. H. Butterfield, Richmond, Surrey, England, assignor to Beecham Group Limited, Brentford, Middlesex, England
No Drawing. Filed July 22, 1969, Ser. No. 843,845
Int. Cl. A61k 27/00
U.S. Cl. 424—320      2 Claims

ABSTRACT OF THE DISCLOSURE

A method of lowering an abnormally high level of blood urea in a human patient suffering from diabetes mellitus with associated hyperuraemia wherein the compound 4-guanidino-butyramide and/or its physiologically compatible acid addition salts are administered in non-toxic but effective amounts.

---

This invention relates to a novel method of combatting diabetes mellitus with associated hyperuraemia.

The compound 4-guanidino-butyramide has previously been described in relation to its occurrence and possible formation in living organisms (N. Van Thoai, Biochem et Biophys Acta, 59, 1962, p. 545) but no specific physiological functions of use in medicine has been disclosed. We have found that this compound possesses particularly useful antidiabetic activity.

Diabetes mellitus is primarily associated with the condition of hyperglycaemia, namely the existence of pathologically high levels of blood glucose which in general is the result of impaired insulin activity. A major accompanying effect which frequently occurs in spite of good control by insulin and/or oral hypoglycaemics is hyperuraemia, the existence of pathologically high levels of blood urea; this and associated biochemical alterations lead to toxic effects, retinitis, renal and neurological disturbances and there is no known method of modifying or preventing progressive deterioration.

We have found that 4-guanidino-butyramide possesses valuable antidiabetic activity in that it exerts by the oral route some hypoglycaemic action and, more significantly, pronounced hypouraemic action. No drugs have previously been described which exert hypouraemic action.

According to the present invention, therefore, we provide a method of combatting diabetes mellitus and associated hyperuraemia in warm-blooded animals including man whereby an effective but non-toxic amount of 4-guanidino-butyramide or a physiologically compatible acid addition salt thereof is administered to the diabetic subject.

Although there is some commercial interest in combatting diabetes in other warm-blooded animals, the method according to the invention is predominantly significant in human medicine.

The physiologically compatible acid addition salts of 4-guanidino-butyramide include, for example, the hydrochloride, hydrobromide, sulphate, nitrate, phosphate, acetate, propionate, maleate, citrate, tartrate, fumarate, and hydrocarbon-sulphonates such as the p-toluene-sulphonate.

The active compound of use in the invention may be formulated in conventional manner and is preferably in dosage unit form to facilitate prescription, for example in the form of tablets, pills, sachets, capsules including delayed action forms, chewing gum, suppositories, ampoules of injectable liquid, etc.; each dosage unit preferably contains 5 to 1000 mg. of the active guanidine compound advantageously 10 to 500 mg., for example 20 to 400 mg.

The carrier in the solid oral forms may, for example, include gelatin, lactose, starch, talc, magnesium stearate, hydrogenated oils, polyglycols, etc. Suppositories may contain a conventional suppository base, e.g. cocoa butter, polyglycols, etc. with or without surface active agents. The tablets may be coated and for delayed action tablets or granules having an enteric coating may be used.

The injectable preparations may take the form of aqueous or oily solutions or suspensions. Suitable vehicles for injectable preparations include for example, sterile pyrogen-free water, parenterally acceptable oils or other non-aqueous media or oil-containing emulsions, if desired containing suspending, dispersing, stabilising, emulsifying, solubilising or buffering agents. Buffered solutions, preferably have a pH in the physiological range, advantageously 6.5–7.

The compositions may also take the form of liquid oral preparations such as syrups, elixirs, emulsions, etc. which may contain suspending, emulsifying, stabilising or thickening agents together with suitable sweetening, flavouring, colouring or preserving agents. The concentration of active substance in these preparations is preferably between .05 and 20% by weight.

Preparations for inhalation preferably take the form of aerosols containing, for example, conventional aerosol propellants, such as fluorohydrocarbons, etc.

Further compositions include powders or granules for reconstitution immediately before injection.

The daily dose of the active guanidine material according to the invention, in the treatment of diabetes mellitus, is preferably 25 to 3000 mg., advantageously 100 to 2000 mg. per day. Since the material is excreted relatively quickly it is preferred to administer the material at least twice during the day, preferably in four equal doses. The material is most conveniently administered by the oral route but may also be given parenterally or rectally. It is particularly useful to administer delayed action formulations to prolong release and reduce loss of active material by excretion.

Clinical studies which we have carried out indicate consistent lowering of raised blood urea and the effect is thought to be of a metabolic nature whereby urea is utilized or converted, rather than a function of a change in renal haemodynamics whereby urea elimination is increased. In a group of 8 diabetic patients, the mean initial blood urea level was 53.6 mg./100 ml. while the final level was 31.9 mg./100 ml., a fall of 21.7 mg./100 ml. over 2.5 weeks. In over 100 patients no side effects or complications have been observed at dosage levels between 300 and 1200 mg./day. In individual cases, improvements of retinopathy and neuropathy have been observed.

It is particularly useful to administer the drug in combination with insulin, or insulin active materials such as amorphous or crystalline zinc insulin or N-acyl insulin. The drug may also advantageously be administered in conjunction with biguanide drugs such as phenformin or metformin etc. or with hypoglycaemic sulphonamides and sulphonyl ureas. In such cases, the doses of the hypoglycaemic drugs will usually be those conventionally used although the beneficial effect of the 4-guanidino-butyramide may enable these dose levels to be decreased.

4-guanidino-butyramide may be obtained by reaction of an ester of 4-guanidino-butyric acid, for example the methyl or ethyl ester, with ammonia, advantageously in an inert solvent such as methanol or ethanol. The ester starting material may be obtained by esterification of 4-guanidino-butyric acid with the appropriate alcohol, advantageously using an acid catalyst such as hydrochloric acid.

The following is an illustration of one method of preparation:

Methyl 4-guanidino butyrate 25 gms. 4-guanidino butyric acid are suspended in 500 mls. of dried methyl alcohol. Hydrogen chloride gas is bubbled in at room temperature with vigorous stirring, and bubbling is continued for about 90 mins. after the acid has dissolved. The solution is concentrated in vacuo at 40° C. and the residue redissolved in methyl alcohol. Hydrogen chloride gas is bubbled through again for about 1 hour and the procedure repeated until esterification is complete. The solution is concentrated in vacuo to dryness and the product recrystallised from methyl alcohol. M.P.=110° C.–112° C.

4-guanidino butyramide 150 mls. methyl alcohol, contained in a pressure bottle are cooled in a freezing mixture and saturated with ammonia. 20 gms. of 4-guanidino butyric acid methyl ester hydrochloride are dissolved in this solution and whilst still cold the pressure bottle and its contents are placed in a pressure frame and allowed to stand at room temperature for 3 days. The bottle is then placed in a freezing mixture and removed from the frame. The solution is concentrated in vacuo at below 40° C., methyl alcohol is added and the evaporation is repeated twice. The product is finally collected and dried and recrystallised from methanol, M.P. 108° C. Calc. for $$C_5H_{13}N_4OClN = 31.0\%$$

Found N=31.0%.

The following examples are also given of formulations of use in the method according to the invention:

EXAMPLE 1

TABLETS.—ETHYL 4-GUANIDINO BUTYRATE HYDROCHLORIDE 500 MGM.

| | G. | Per table mgm. |
|---|---|---|
| 4-guanidino-butyramide HCl | 1,000 | 500 |
| Maize starch (dried) | 120 | 60 |
| Acacia (mucilage of 10% concentration) | 20 | 10 |
| Lubricant | 60 | 30 |
| Formula of lubricant: | | |
| Starch | 6 | |
| Talc | 2 | |
| Magnesium stearate | 0.25 | |

Procedure 1000 g. 4-guanidino butyramide hydrochloride are thoroughly mixed together with 120 g. of maize starch in the dried state. 20 g. of acacia is added (as a mucilage of 10% concentration) and mixed with the above. The mixture is granulated by passing through a sieve of suitable porosity, e.g. No. 8 (B.P.). The granules so formed are dried in an oven or in a fluid bed dryer at 60° C. The dried granules are then passed through a second sieve, e.g. No. 10 (B.P.). The granules are weighed and the required amount of lubricant added with thorough mixing. The mixture is finally pressed into tablets using an automatic tabletting machine. In some cases it is desirable that the tablets are enteric coated or sugar coated.

Alternatively, the tablets may be prepared by mixing the compound with starch and talc according to the formula:

| | Parts |
|---|---|
| 4-guanidino butyramide hydrochloride | 250 |
| Maize starch B.P. (dried) | 25 |
| Talc B.P. | 4 |

The mixture is compressed into large crude tablets ½" to 1" in diameter which are then broken up and passed through a No. 12 sieve. The resultant granules are mixed with lubricant (15 parts lubricant to 279 parts granules) and then compressed into tablets each containing 250 mgm. of 4-guanidino butyramide hydrochloride. The tablets may then be varnished and sugar coated.

EXAMPLE 2

4-GUANIDINO-BUTYRAMIDE HYDROCHLORIDE 250 MG.

| | Gm. | Per capsule, mgm. |
|---|---|---|
| Capsule formula: | | |
| 4-guanidino-butyramide HCl | 250 | 250 |
| Lubricant | 5 | 5 |
| Lubricant formula: | | |
| Magnesium stearate | 2.5 | 2.5 |
| Talc | 2.5 | 2.5 |

Procedure 250 gm. of 4-guanidino-butyramide hydrochloride are thoroughly mixed together with 5 mgs. of the lubricant. The resulting free flowing powder is filled directly into hard gelatine capsules, using a suitable dry capsule filling machine.

Alternatively the compound is passed through a No. 60 sieve and mixed with 3% of its own weight of a lubricant which may consist only of talc B.P. or of a mixture of equal parts of talc B.P. and magnesium stearate. The mixture may then be filled into two-piece hard-shell gelatine capsules.

EXAMPLE 3.—AMPOULES 4-guanidino butyramide hydrochloride

The 4-guanidino butyramide hydrochloride may be dissolved in potable water distilled from a neutral glass or metal still fitted with an efficient device for preventing the entrainment of droplets. The solution may be buffered within the physiological pH range using a Sorensen type phosphate buffer. It may also be made isotonic with blood serum by the addition of sodium chloride B.P. Chlorocresol B.P. may be added to the extent of 0.1% to effect preservation if required.

The solution may then be sterilised by filtration according to the British Pharmacopoeia 1963 and filled into suitable sterile ampoules or vials.

EXAMPLE 4.—SUPPOSITORIES 4-guanidino butyramide hydrochloride

The 4-guanidino butyramide hydrochloride is reduced to a fine powder by passing through a No. 100 sieve and incorporated in the molten suppository base (for example Oil of Theobroma B.P.) according to the following formula:

4-guanidino butyramide hydrochloride: 500 mgm.
Oil of theobroma to fill a 2 g. mould The mixture is then poured into suitable moulds.

We claim:
1. A method of lowering an abnormally high level of blood urea in a human patient suffering from diabetes mellitus with associated hyperuraemia, which comprises orally administering to said patient from 300 mg. to 1200 mg. per day of 4-guanidino-butyramide.
2. The method of claim 1 in which 4-guanidino-butyramide is administered two to four times per day.

References Cited

Chemical Abstracts, vol. 51 (1957), 10605, The Lancet, Sept. 9, 1961, p. 563.

ALBERT T. MEYERS, Primary Examiner

F. E. WADDELL, Assistant Examiner